April 3, 1956
C. W. OLSON ET AL
2,740,250
BALE STACKER AND DROPPER
Filed Feb. 6, 1952
4 Sheets-Sheet 1
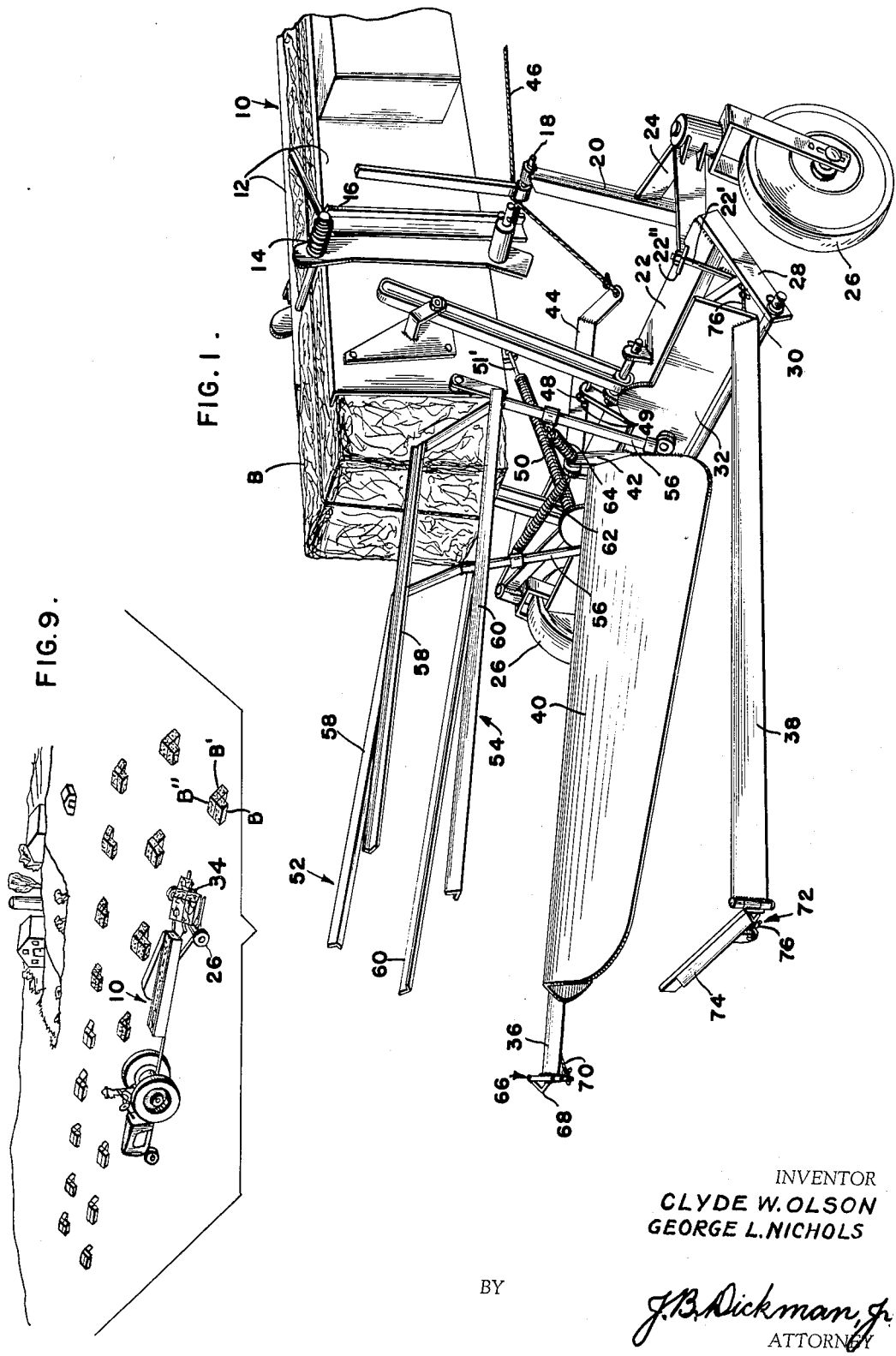
INVENTOR
CLYDE W. OLSON
GEORGE L. NICHOLS
BY
J.B.Dickman, Jr.
ATTORNEY

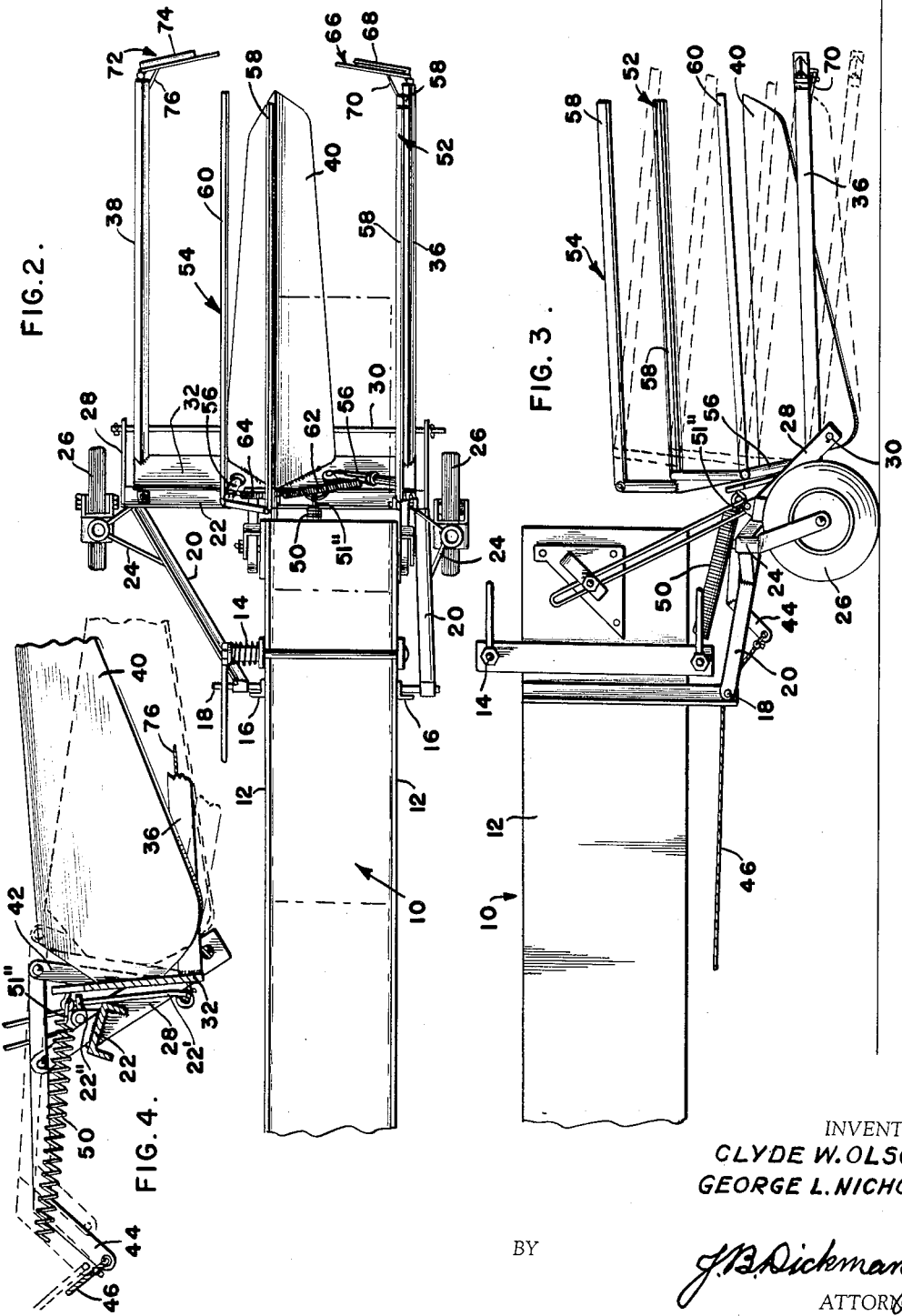

INVENTOR
CLYDE W. OLSON
GEORGE L. NICHOLS

BY J. B. Dickman Jr.
ATTORNEY

April 3, 1956 C. W. OLSON ET AL 2,740,250
BALE STACKER AND DROPPER
Filed Feb. 6, 1952 4 Sheets-Sheet 4

INVENTOR
CLYDE W. OLSON
GEORGE L. NICHOLS

BY
J. B. Dickman Jr.
ATTORNEY

United States Patent Office 2,740,250
Patented Apr. 3, 1956

2,740,250

BALE STACKER AND DROPPER

Clyde W. Olson and George L. Nichols, Edgeley, N. Dak.

Application February 6, 1952, Serial No. 270,124

10 Claims. (Cl. 56—473.5)

The present invention relates to a means for stacking bales and more particularly bales of hay.

It is well known that hay after cutting must be cured and as a consequence it is frequently left in the field in windrows for this purpose. In other instances the freshly cut hay is gathered and compressed in a portable hay baler and the bales are deposited in the field for curing. In either event the hay being left in the field is subject to spoilage through moisture and dampness particularly during periods of inclement weather as it is likely whether left in the field in windrows or in bales to become water soaked with resultant loss to the farmer.

The primary object of this invention is to secure the benefits of sun curing and at the same time avoid the losses accompanying the methods heretofore employed.

Another object of the present invention is to secure the advantages of having the hay freshly baled and to prevent the bales from absorbing moisture either from the ground or from water falling thereon.

The above and other objects may be attained by employing this invention which embodies among its features while supporting a substantially rectangular bale in an upwardly tilted position depositing a second substantially rectangular bale against the first mentioned bale is an oppositely tilted position to lean against the first mentioned bale and form a substantially V-shaped trough between the top sides of the bales, and depositing a third bale in the V-shaped trough to rest on the first and second bales.

Other features include while advancing a portable baling press and forming bales of substantially rectangular cross section, tilting the bales after they are formed to produce self sustaining stacks and depositing the stacks on the ground so that only the edges of the lowermost bales contact the ground.

Still other features include a bale stacking attachment for a baling press which includes a ridge bar carried by a baling press and extending longitudinally therefrom adjacent and below the discharge end of the baling chamber and to one side of the longitudinal axis of said chamber, supporting bars carried by the baling press below and on opposite sides of the ridge bar for cooperating with the ridge bar in receiving bales delivered by the press and holding them in oppositely tilted positions with their upper edges in juxtaposition, and releasable means carried by the baling press and connected to the bars for holding the bars against downward movement under the weight of bales carried thereby.

Still further features include yielding means carried by the baling press and connected to the bars to yieldingly urge the bars upwardly when the bales have been removed therefrom.

In the drawings:

Figure 1 is a fragmentary perspective view of a baling press showing this improved bale stacker connected thereto.

Figure 2 is a top plan view of the structure shown in Figure 1, on a reduced scale.

Figure 3 is a side view of the structure shown in Figure 2, on a reduced scale.

Figure 4 is a fragmentary longitudinal sectional view through the stacker.

Figure 9 is a perspective view of a field showing the stacker and a group of bales stacked and ready for curing.

Figure 5:
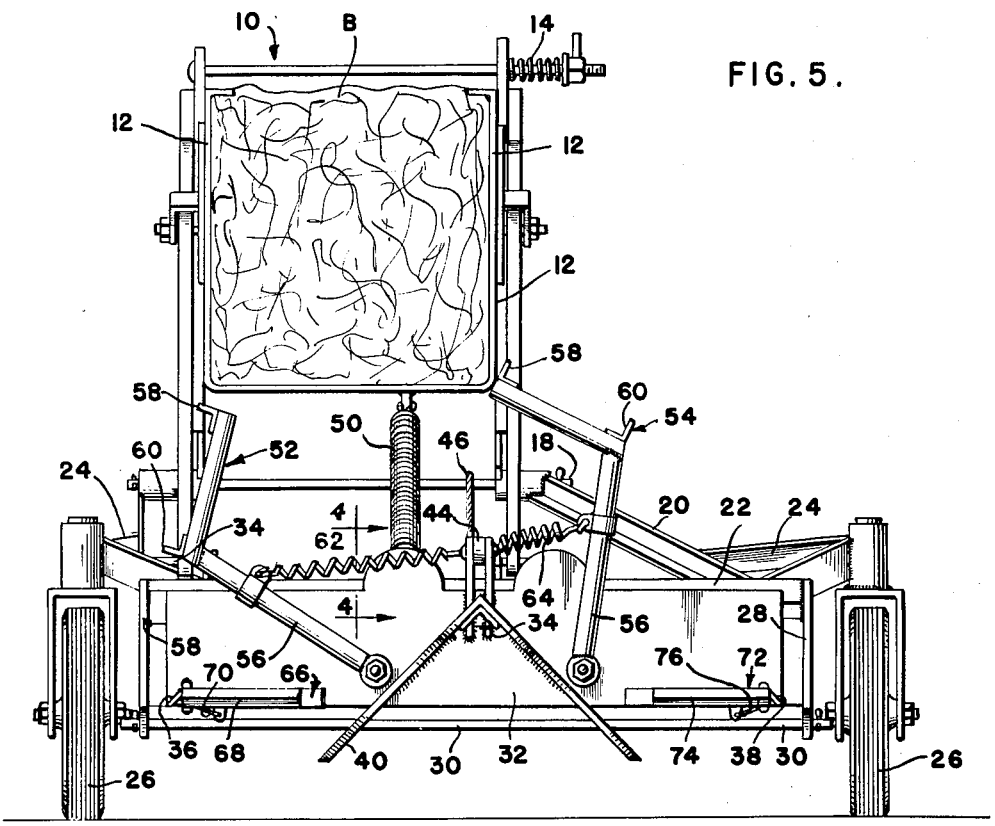
Figure 5 is an enlarged rear end view of the bale stacker showing a bale being delivered thereonto from a baling press.

Referring to the drawings in detail a portable baling press designated generally 10 is provided with an elongated baling chamber of conventional construction in which hay is compressed into bales B between conventional yielding side walls 12 which are held in the desired adjustment by conventional clamps 14. The bailing press is of the conventional type which produces a conventional elongated rectangular bale and forms no part of this invention.

Secured to the outer faces of opposite side walls 12 of the baling press 10 adjacent the discharge end of the baling chamber are supporting arms 16 which project below the bottom of the baling chamber and support a substantially horizontal pivot bar 18 which extends transversely of the baling press 10 beneath the baling chamber thereof.

Mounted on the pivot bar 18 for rocking movement about the axis thereof adjacent opposite side walls 12 of the bailing chamber are divergent arms 20 carrying adjacent their ends remote from the pivot bar 18 a transversely extending frame bar 22. Substantially V-shaped brackets 24 are connected to the arms 20 and frame bar 22 and mounted on the brackets 24 for rotary movement about substantially vertical axes are caster wheels 26 upon which the frame bar is supported for movement in spaced relation to the ground. Carried by the frame bar 22 are spaced rearwardly extending legs 28 carrying in spaced parallel relation to the frame bar 22 a rock shaft 30 which lies substantially parallel to the pivot shaft 18.

Mounted on the rock shaft 30 for rocking movement in a vertical arcuate path about the axis of said shaft is an elongated plate 32 carrying intermediate its ends a ridge bar 34 which extends longitudinally from the baling press 10 below the bottom of the baling chamber and to one side of the longitudinal axis thereof (Figure 5). Bale supporting bars 36 and 38 are carried by the plate 32 below and in spaced parallel relation to the top of the ridge bar 34 and these bars 36 and 38 are symmetrically disposed on opposite sides of the ridge bar 34 as will be readily understood upon reference to the drawings. In the preferred form of the invention the ridge bar 34 is provided with an inverted transversely V-shaped guard apron 40 which serves in guiding the bales B against the supporting bars 36 and 38 as they leave the baling chamber.

Carried by the plate 32 intermediate the ends thereof is an upwardly extending arm 42 to which is pivoted adjacent its upper end a trip lever 44 which extends beneath the baling chamber of the baling press 10 and has connected thereto a trip cable 46 which leads forwardly to a location adjacent the operator's station for convenient operation by the operator of the device. A latch finger 48 is carried by the bar 22 and extends upwardly therefrom for engagement in a notch 49 to hold said plate and the ridge bar 34 and supporting bars 36 and 38 against downward rotation about the axis of the rock shaft under the influence of bales supported thereon. A retractile coiled spring 50 has one end 51' coupled to the baling press 10 beneath the baling chamber and its opposite end 51" to the plate 32 for exerting yielding effort on the plate 32 to rock it about the axis of the rock shaft 30 to elevate the ends of the ridge bar 34 and the supporting bars 36 and 38 remote from the plate 32.

Pivotally mounted on the plate 32 adjacent the side of the apron 40 adjacent the supporting bar 36 for rocking movement in an arcuate path which lies transversely of the baling press is a bale guide designated generally 52, and a similar bale guide designated generally 54 is pivotally carried by the plate 32 adjacent the opposite side of the apron 40. Each such bale guide comprises a rock arm 56 carrying a pair of spaced parallel bale guides 58 and 60. A retractile coiled spring 62 is connected at one end to the rock arm 56 of the bale guide 52 and at its opposite end to the arm 42 for yieldingly holding the bale guide 52 upwardly and in the position illustrated in Figure 5. A similar retractile coiled spring 64 is connected at one end to the rock arm 56 of the bale guide 54 and yieldingly holds said bale guide 54 in its uppermost position as shown in Figure 5. The exact relaxed position of either rock of the rock arms of the bale guides 52 or 54 is not critical so long as the uppermost guide bars 58 carried thereby lie out of the line of delivery of a bale leaving the press 10.

Carried by the bale supporting bar 36 adjacent the end thereof remote from the plate 32 is a gate member 66 in which is mounted for movement in a substantially horizontal arcuate path a stop 68 to which a control cable 70 is connected for moving said stop in the aforesaid arcuate path from an inactive position in which it lies substantially in alignment with the supporting bar 36 to an active position in which it lies substantially perpendicular to the bar 36. Mounted on the bale supporting bar 38 adjacent the end thereof remote from the plate 32 is a gate member 72 in which is pivotally mounted for movement in a substantially horizontal arcuate path from an inactive position substantially in alignment with the bar 38 to an active position substantially perpendicular thereto a stop 74. A control cable 76 is connected to the stop 74 adjacent the gate member 72 and extends beneath the bale supporting bar 38 and through the plate 32. The control cable 70 extends beneath the supporting bar 36 through the plate 32 and both the control cables 70 and 76 are connected for longitudinal adjustment to rod 22' carried by ears 22" on the frame bar 22 so that as the ends of the ridge bar 34 and supporting bars 36 and 38 remote from the plate 32 move upwardly about the axis of the rock bar 30 under the influence of the spring 50 pull will be exerted on the cables 70 and 76 to move the stops into active position in which they are held by the latch finger 48.

Figure 6:
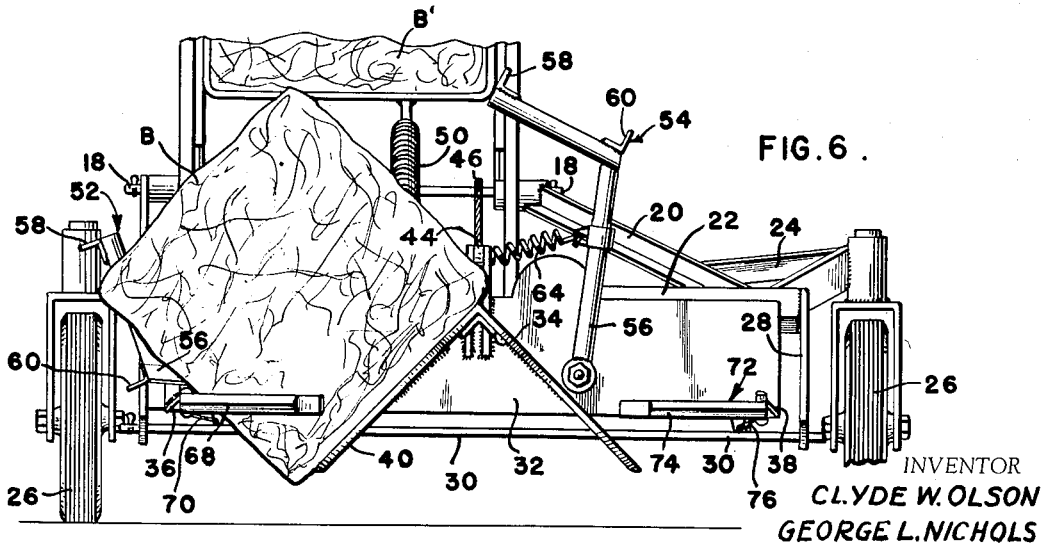
Figure 6 is a view similar to Figure 5 showing the first bale in stacked position and a second bale being delivered thereonto from the baling press.
Figure 7:
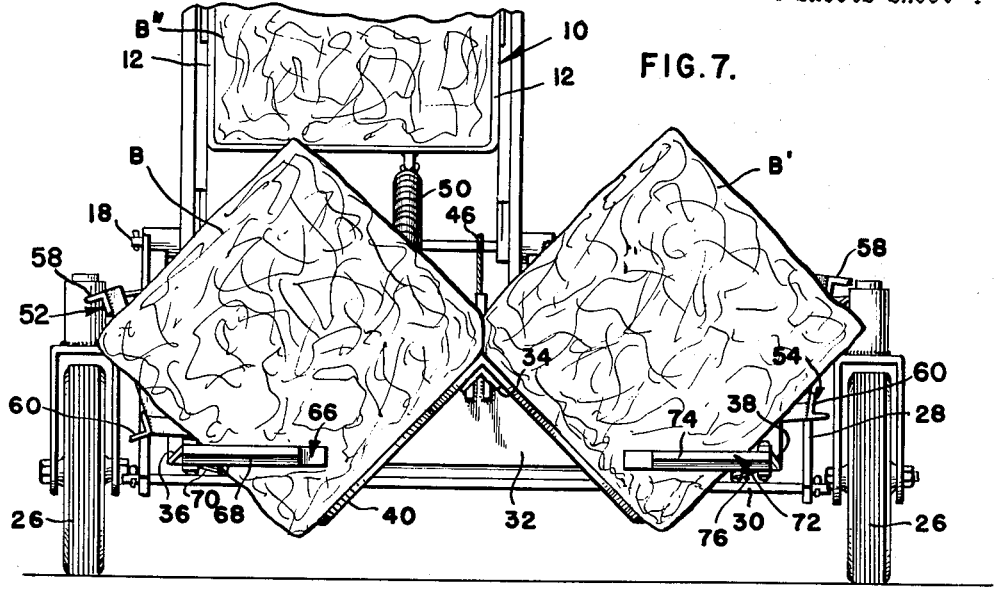
Figure 7 is a view similar to Figure 6, showing the second bale in stacked position and a third bale being delivered from the press onto the stacked bales.
Figure 8:
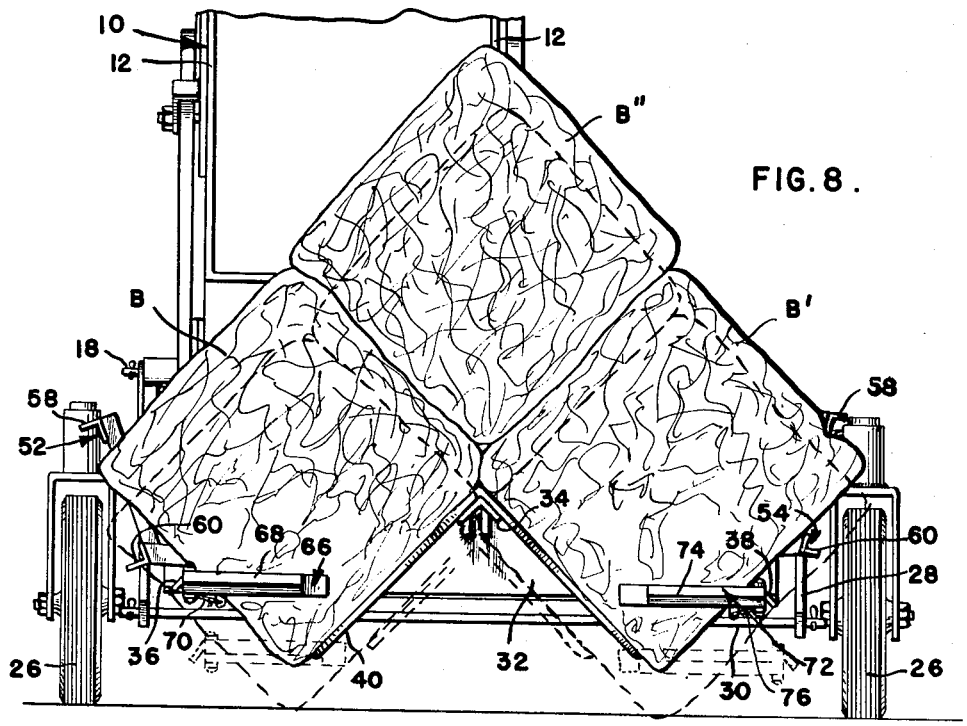
Figure 8 is an enlarged view showing the bales in stacked position on the stacker ready for delivery onto the field.

In use, a bale B leaving the baling chamber of the baling press 10 falls downwardly onto the upper edge of the ridge bar 34 and owing to the fact that the ridge bar 34 is disposed to one side of the longitudinal axis of the baling press, the bale B will be tilted longitudinally and will slide down the apron 40 and come to rest in substantially the position shown in Figure 6 against the supporting bar 36. As the bale moves downwardly it is engaged by the bale guide 52 and its impact against the bar 36 is cushioned by the spring 62. With the bale B in a tilted position between the ridge bar 34 and the supporting bar 36, a second bale B' upon leaving the baling chamber slides upon the uppermost edge of the bale B which lies on the side of the axis of the baling press opposite the ridge bar 34. This causes bale B' to tilt longitudinally in the direction opposite the bale B so that it slides down the bale B and onto the side of the apron 40 opposite the bale B. Bale B' is engaged by the bale guide 54 and under the cushioning effort of the spring 64 comes to rest against the supporting bar 38 so that the adjacent faces of the bales B and B' form an X. A third bale B" issuing from the baling chamber slides upon the uppermost edge of the bale B and tilts longitudinally in the direction of the bale B' and comes to rest in the V-shaped trough formed by the adjacent uppermost faces of the bales, and B'. With the bales B, B' and B" thus stacked on the stacker, the operator exerts pull on the trip cable 46 to lift the lever 44 and disengage the latch finger 48 from the notch 49 thus permitting the bars 34, 36 and 38 to move downwardly under the weight of the stacked bales until the lower edges of the bales B and B' rest on the ground. Simultaneously with the downward movement of the bars 36 and 38 the tension of the cables 70 and 76 on the stops 68 and 74 is relieved so that as the baling press moves away from the stack of bales deposited on the ground as previously described the stops will move in their arcuate paths to a position substantially in adjustment with the bars 36 and 38 so as to leave the stack of bales in stacked position on the ground. As soon as the ends of the stops 68 and 70 remote from the gate members 66 and 72 pass beyond the stacked bales, the spring 50 will rock the plate 32 about the axis of the rock shaft 30 to restore the bars 34, 36 and 38 to their initial positions ready for a repeat operation and the springs 62 and 64 will swing the bale guides 52 and 54 to their uppermost bale receiving positions. Also the cables 70 and 76 will be placed under tension to move the stops 68 and 74 inwardly and into a position to keep bales resting on the bars 34, 36 and 38 from sliding off of the ends of the bars until the trip arm 44 is again tripped.

While the invention has been disclosed in connection with certain specific embodiments thereof, it is to be noted that these are by way of example rather than by way of limitations and that the invention is to be defined by the attendant claims which should be given a scope as broad as is consistant with the prior art.

What is claimed is:

1. A bale stacker for stacking bales as they are delivered from a baling press, said bale stacker comprising spaced parallel bale supporting bars carried by and extending longitudinally from said baling press adjacent and below the delivery end thereof, a ridge bar carried by said press below the delivery end thereof and above the level of the supporting bars, and said ridge bar extending parallel with the supporting bars and being offset laterally relative to the longitudinal axis of the baling press whereby a bale extruded from the baling press will engage the ridge and be held against a supporting bar in a tilted position.

2. A bale stacker for stacking bales as they are delivered from a baling press, said bale stacker comprising spaced parallel bale supporting bars carried by said baling press for movement about a horizontal axis which lies transversely of the baling press, said supporting bars extending longitudinally from and lying below the delivery end of said baling press, a ridge bar carried by the baling press for movement in unison with the supporting bars, said ridge bar lying below the delivery end of the baling press and above the supporting bars and to one side of the longitudinal axis of the baling press whereby a bale extruded from the press will engage the ridge bar and be held against a supporting bar in a tilted position, and means carried by the baling press and connected to the bars for releasably holding them against downward movement under the influence of bales supported thereon.

3. A bale stacker for stacking bales as they are delivered from a baling press, said bale stacker comprising spaced parallel bale supporting bars carried by said baling press for movement about a horizontal axis which lies transversely of the baling press, said supporting bars extending longitudinally from and lying below the delivery end of said baling press, a ridge bar carried by the baling press for movement in unison with the supporting bars, said ridge bar lying below the delivery end of the baling press and above the supporting bars and to one side of the longitudinal axis of the baling press whereby a bale extruded from the press will engage the ridge bar and be held against a supporting bar in a tilted position, manually releasable means carried by the baling press and connected to the bars for holding them against downward movement under the influence of bales supported thereon, and yielding means carried by the baling press and connected to the bars for moving them upwardly and into connection with the releasable means.

4. In a baling press of the portable type having an elongated baling chamber in which bales are formed and through one end of which the formed bales are discharged, means for stacking said bales as they are delivered from the baling chamber comprising an elongated ridge bar carried by the baling press and extending longitudinally therefrom and below the discharge end of the baling chamber to one side of the longitudinal axis thereof, and elongated bale supporting bars carried by the baling press and symmetrically disposed on opposite sides of the ridge bar for cooperating with the ridge bar in supporting bales discharged from the press in a tilted position.

5. In a baling press of the portable type having an elongated baling chamber in which bales are formed and through one end of which the formed bales are discharged, means for stacking said bales as they are delivered from the baling chamber comprising a plate carried by the baling press adjacent the discharge end of the baling chamber for rocking movement about a substantially horizontal axis which extends transversely of the baling press below the discharge end of the baling chamber, a ridge bar carried by the plate below the discharge end of the baling chamber and to one side of the longitudinal axis thereof, said ridge bar extending longitudinally from the baling press beyond the discharge end of the baling chamber, bale supporting bars carried by the plate and extending therefrom in spaced parallel relation to the ridge bar for cooperation with the ridge bar in supporting bales discharged from the baling chamber in oppositely tilted positions, releasable means carried by the press and engaging the plate for releasably holding the bars against tilting movement under the influence of bales supported thereon.

6. In a baling press of the portable type having an elongated baling chamber in which bales are formed and through one end of which the formed bales are discharged, means for stacking said bales as they are delivered from the baling chamber comprising a plate carried by the baling press adjacent the discharge end of the baling chamber for rocking movement about a substantially horizontal axis which extends transversely of the baling press below the discharge end of the baling chamber, a ridge bar carried by the plate below the discharge end of the baling chamber and to one side of the longitudinal axis thereof, said ridge bar extending longitudinally from the baling press beyond the discharge end of the baling chamber, bale supporting bars carried by the plate and extending therefrom in spaced parallel relation to the ridge bar for cooperation with the ridge bar in supporting bales discharged from the baling chamber in oppositely tilted positions, releasable means carried by the press and engaging the plate for releasably holding the bars against tilting movement under the influence of bales supported thereon, and yielding means carried by the press and connected to the plate for moving the plate and tilting the bars upwardly about the horizontal axis when no bales are supported by the bars.

7. In a baling press of the portable type having an elongated baling chamber in which bales are formed and through one end of which the formed bales are discharged, means for stacking said bales as they are delivered from the baling chamber comprising a plate carried by the baling press adjacent the discharge end of the baling chamber for rocking movement about a substantially horizontal axis which extends transversely of the baling press below the discharge end of the baling chamber, a ridge bar carried by the plate below the discharge end of the baling chamber and to one side of the longitudinal axis thereof, said ridge bar extending longitudinally from the baling press beyond the discharge end of the baling chamber, bale supporting bars carried by the plate and extending therefrom in spaced parallel relation to the ridge bar for cooperation with the ridge bar in supporting bales discharged from the baling chamber in oppositely tilted positions, releasable means carried by the press and engaging the plate for releasably holding the bars against tilting movement under the influence of bales supported thereon, and bale guides carried by the plate for movement with the bales as they tilt about the ridge bar and engage the supporting bars.

8. In a baling press of the portable type having an elongated baling chamber in which bales are formed and through one end of which the formed bales are discharged, means for stacking said bales as they are delivered from the baling chamber comprising an elongated ridge bar carried by the baling press and extending longitudinally therefrom and below the discharge end of the baling chamber to one side of the longitudinal axis thereof, and elongated bale supporting bars carried by the baling press and symmetrically disposed on opposite sides of the ridge bar for cooperating with the ridge bar in supporting bales discharged from the press in a tilted position, and stops carried by the supporting bars remote from the baling press and extending toward the ridge bar for preventing bales deposited on the supporting bars from moving beyond the ends of the supporting bars.

9. In a baling press of the portable type having an elongated baling chamber in which bales are formed and through one end of which the formed bales are discharged, means for stacking said bales as they are delivered from the baling chamber comprising an elongated ridge bar carried by the baling press and extending longitudinally therefrom and below the discharge end of the baling chamber to one side of the longitudinal axis thereof, elongated bale supporting bars carried by the baling press and symmetrically disposed on opposite sides of the ridge bar for cooperating with the ridge bar in supporting bales discharged from the press in a tilted position, and stops carried by the supporting bars remote from the baling press and extending toward the ridge bar for preventing bales deposited on the supporting bars from moving beyond the ends of the supporting bars, and manually actuated means carried by the baling press and connected to the stops for moving said stops to permit the discharge of stacked bales from the supporting bars.

10. In a baling press of the portable type having an elongated baling chamber in which bales are formed and through one end of which the formed bales are discharged, means for stacking said bales as they are delivered from the baling chamber comprising a plate carried by the baling press adjacent the discharge end of the baling chamber for rocking movement about a substantially horizontal axis which extends transversely of the baling press below the discharge end of the baling chamber, a ridge bar carried by the plate below the discharge end of the baling chamber and to one side of the longitudinal axis thereof, said ridge bar extending longitudinally from the baling press beyond the discharge end of the baling chamber, bale supporting bars carried by the plate and extending therefrom in spaced parallel relation to the ridge bar for cooperation with the ridge bar in supporting bales discharged from the baling chamber in oppositely tilted positions, releasable means carried by the press and engaging the plate for releasably holding the bars against tilting movement under the influence of bales supported thereon, yielding means carried by the press and connected to the plate for moving the plate and tilting the bars upwardly about the horizontal axis when no bales are supported by the bars, stops carried by the supporting bars and projecting toward the ridge bar for preventing bales deposited on the supporting bars from moving longitudinally thereof, and means carried by the baling press and connected to the stops for moving the stops out of the path of movement of the bales during the discharge of stacked bales from the bale stacker.

References Cited in the file of this patent

UNITED STATES PATENTS

| | | |
|---|---|---|
| 199,975 | Hayes | Feb. 5, 1879 |
| 1,488,540 | Harter | Apr. 1, 1924 |
| 2,112,486 | Francis et al. | Mar. 29, 1938 |
| 2,327,264 | Hendrickson | Aug. 17, 1943 |
| 2,431,892 | Russell | Dec. 2, 1947 |
| 2,453,384 | Renken | Nov. 9, 1948 |